United States Patent [19]

Bennett

[11] Patent Number: 5,437,002
[45] Date of Patent: Jul. 25, 1995

[54] WATER HEATER CONTROL CIRCUIT INCLUDING AN EMPTY TANK SENSOR

[75] Inventor: Steven B. Bennett, Manitowoc, Wis.

[73] Assignee: Paragon Electric Company, Inc., Two Rivers, Wis.

[21] Appl. No.: 167,511

[22] Filed: Dec. 15, 1993

[51] Int. Cl.6 .............................................. H05B 1/02
[52] U.S. Cl. ...................................... 392/441; 392/442; 374/102; 374/107; 340/589; 219/497; 219/501
[58] Field of Search ............... 219/497, 499, 501, 508, 219/494; 392/441–443; 340/588, 589; 374/102, 107

[56] References Cited

U.S. PATENT DOCUMENTS

| | | |
|---|---|---|
| 4,360,128 | 11/1982 | Neumann . |
| 4,409,694 | 10/1983 | Barrett, Sr. et al. ............ 4/545 |
| 4,551,611 | 11/1985 | Longo . |
| 4,633,066 | 12/1986 | Chang . |
| 4,641,011 | 2/1987 | Roberts . |
| 4,641,012 | 2/1987 | Roberts . |
| 4,670,404 | 6/1987 | Swift et al. ..................... 436/147 |
| 4,838,152 | 6/1989 | Kubicko . |
| 4,841,849 | 6/1989 | Shimomura et al. . |
| 4,886,955 | 12/1989 | Kimura ............................ 219/494 |
| 5,183,998 | 2/1993 | Hoffman et al. ................ 219/492 |
| 5,229,751 | 7/1993 | Chandler et al. ............... 340/618 |

*Primary Examiner*—Mark H. Paschall
*Attorney, Agent, or Firm*—Foley & Lardner

[57] ABSTRACT

A water heating system for a commercial coffee brewer includes a control circuit having a dry bowl cut out circuit. The system includes a control circuit, tank, and heater. The dry bowl cut out circuit receives a differentiated temperature signal and generates a control signal when the differentiated signal is above a predetermined threshold. The control signal represents that the tank is empty. The heater is turned OFF in response to the control signal. Also, the control circuit includes an operating temperature circuit and high limit temperature circuit for controlling the heater. A switch in the heater is electromagnetically coupled to the control circuit.

20 Claims, 3 Drawing Sheets

WATER HEATER CONTROL CIRCUIT INCLUDING AN EMPTY TANK SENSOR

BACKGROUND OF THE INVENTION

The present invention relates to a fluid heating or cooling system. More particularly, the present invention relates to a control circuit for determining the level of contents in a tank in a water heating system. Even more particularly, the present invention relates to a control circuit having a dry bowl sensing circuit for a coffee brewer system.

Fluid heating systems generally include a tank and a heater. The tank is filled with a liquid to be heated. Liquid is often removed from the tank as the liquid is heated. As the tank becomes empty, the remaining liquid, heater, and tank become hotter much more quickly. In order to prevent the heater and tank from overheating, or to prevent unnecessary use of the heater, liquid heating Systems often include liquid level sensors which determine when the tank is empty.

Water heating systems utilized in coffee brewing machines include a tank in thermal communication with a heater. Water is heated in the tank, and the water level in the tank decreases as water drips out an exit port. When the tank is empty (a dry bowl condition), the heater should be turned off to protect the heater and tank.

Prior art coffee brewers utilized costly fluid sensors disposed in the tank to determine the amount of water in the tank. Other prior art coffee brewers utilize a timing technique which assumes that the tank is empty after a particular amount of time and turns the heater off. However, this technique is unable to compensate for ambient conditions and clogged conduits which can affect the amount of time to empty the tank. Thus, this technique is disadvantageous because the coffee brewer may be turned off prematurely when the tank still contains water or too late when the tank is empty.

It would therefore be advantageous to have an inexpensive apparatus for accurately determining whether a tank in a water heater system is empty.

SUMMARY OF THE INVENTION

The present invention provides an apparatus for use in a container system including a temperature controller and a container adapted to contain contents. The temperature controller controls the temperature of the contents in response to a mode signal. The apparatus includes temperature sensing means for sensing the temperature, differentiator means for providing a differentiated signal, control means for generating an empty container signal, and an output means for providing the mode signal. The temperature sensing means generates a temperature signal related to the temperature of the contents. The differentiator means includes a differentiator input and a differentiator output. The differentiator input is coupled with the temperature sensing means and receives the temperature signal. The differentiator means provides the differentiated signal at the differentiator output. The control means has a control input coupled with the differentiator output and receives the differentiated signal. The control means generates the empty container signal at the control output when the differentiated signal is in a predetermined relationship with a predetermined threshold. The output means is coupled with the control output and provides the mode signal in response to the empty container signal.

The present invention also relates to a water heater control circuit for use in a water heater system including a tank for holding water and a heater for heating the water. The water heater control circuit includes a temperature sensor, a differentiator sensor, and a compare circuit. The temperature sensor is in thermal communication with the water and provides a temperature signal related to the temperature of the water. The differentiator circuit includes a differentiator input coupled with the temperature sensor and a differentiator output. The differentiator circuit receives the temperature signal at the differentiator input and provides a differentiated temperature signal at the differentiator output. The compare circuit has a compare output and a compare input coupled with the differentiator output. The compare input receives the differentiated signal. The compare circuit generates a control signal when the differentiated signal is in a predetermined relationship with a threshold. The heater is turned off by the control signal.

The present invention also relates to an apparatus for use in a fluid temperature control system including a tank adapted to hold the fluid and a temperature controller. The temperature controller controls the temperature of the fluid in response to a first signal being in a first state or a second state. The apparatus includes temperature sensing means for sensing the temperature, differentiating means for differentiating the temperature signal, and control means for generating the first signal. The temperature sensing means is in thermal communication with the fluid and has a sensor output. The temperature sensing means generates a temperature signal related to the temperature at the sensor output. The differentiator means includes a differentiator input coupled with the sensor output for receiving the temperature signal and a differentiator output. The differentiator means provides a differentiated temperature signal at the differentiator output. The control means has a control input coupled with the differentiator output for receiving the differentiated temperature signal and a control output. The control means generates the first signal in the first state when the differentiated signal is in a predetermined relationship with a threshold.

It is an object of the present invention to provide a control circuit comprised of relatively inexpensive components which can accurately determine whether a tank in a water heater system is empty.

It is another object of the present invention to provide a control circuit coupled to a single temperature sensor which can accurately determine whether a tank is empty.

It is yet another object of the present invention to provide a control circuit including a dry bowl sense circuit.

It is a further object to provide a control circuit which latches the heater off in response to a dry bowl condition.

Further objects and features of the present invention will be apparent from the following specification and claims when considered in connection with the accompanying drawings illustrating the preferred exemplary embodiments of the present invention.

BRIEF DESCRIPTION OF THE DRAWINGS

The invention will hereafter be described with reference to the accompanying drawings, wherein like reference numerals denote like elements in the various drawings, and.

DETAILED DESCRIPTION OF THE PREFERRED EXEMPLARY EMBODIMENT

Figure 1:
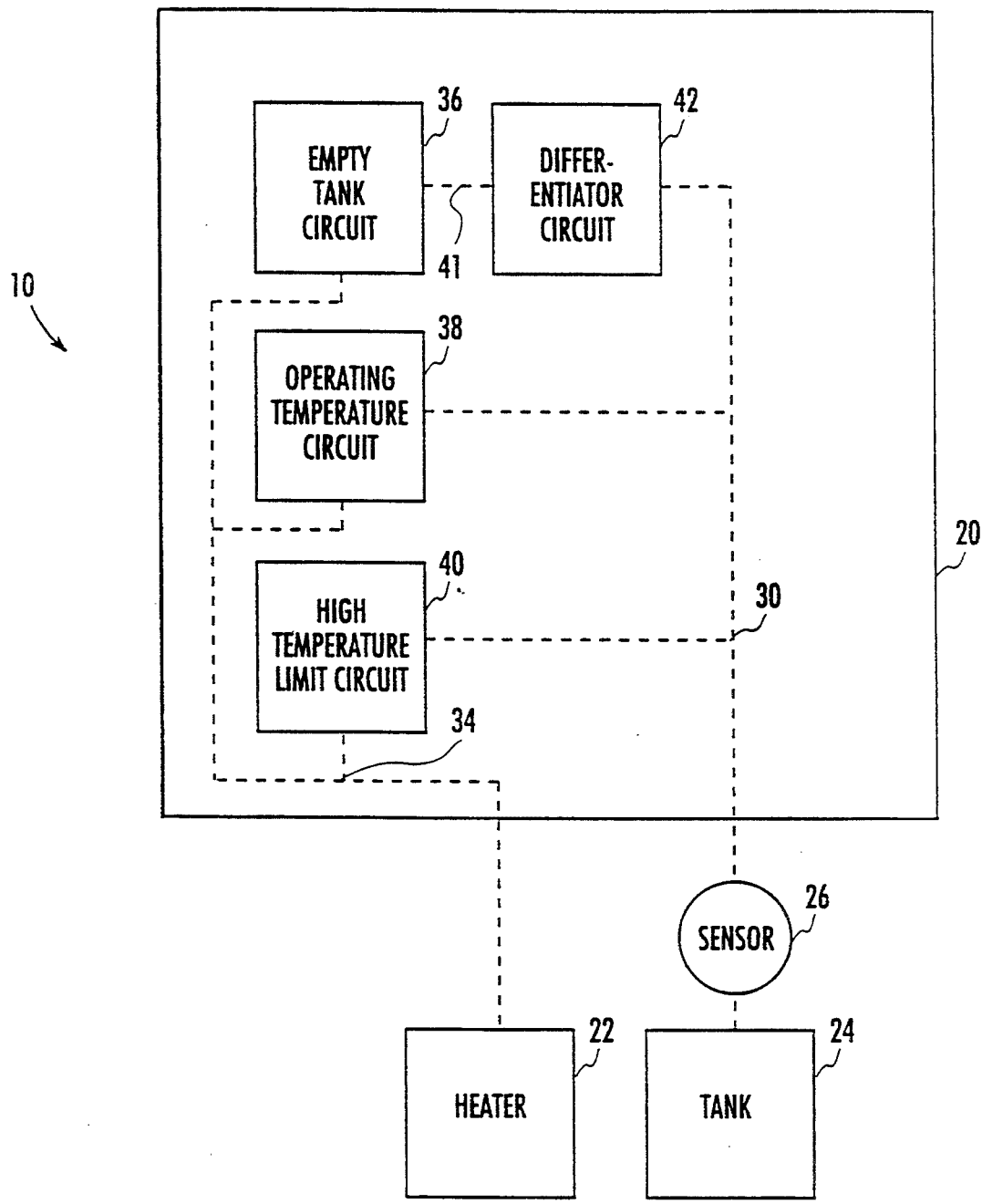
FIG. 1 is a schematic block diagram of a fluid heating system including an exemplary preferred embodiment of the present invention.

FIG. 1 is a schematic block diagram of a fluid heating system including an exemplary preferred embodiment of the present invention. In FIG. 1, a fluid heating system 10 is preferably a water heating system for use in a commercial coffee brewer. However, the preferred exemplary embodiment of the present invention is not solely limited to commercial coffee brewer applications.

Fluid heating system 10 includes a control circuit 20, a heater 22, a tank 24, and a sensor 26. Heater 22 is a temperature controller and may be replaced by a cooling unit or freezing unit depending upon the application. Heater 22 is preferably an electric heater, although heater 22 may be a gas heater or other device which provides heat. Heater 22 is coupled to control circuit 20 via a control link 34.

Tank 24 is preferably adapted to hold a fluid such as water. Sensor 26 may be any device for sensing the temperature of the water in tank 24 and is preferably a thermistor which changes resistance in response to temperature. Sensor 26 is in thermal communication with the water (not shown) in tank 24 and provides a temperature signal to control circuit 20 over a sensor communication link 30. Preferably, the temperature signal is an analog signal, although serial or parallel digital temperature signals could be provided over sensor communication link 30. Sensor communication link 30 is preferably a two wire conductor.

Control circuit 20 preferably turns ON or OFF heater 22 by providing signals over control link 34. Alternatively, control circuit 20 could be arranged to provide various heating signals to heater 22 so that heater 22 provides different levels of heat. Control circuit 20 includes an empty tank circuit 36, an operating temperature circuit 38, a high temperature limit circuit 40, and a differentiator circuit 42. Each of empty tank circuit 36, operating temperature circuit 38, and high temperature limit circuit 40 is capable of changing a mode signal on control link 34 to a first state which turns OFF heater 22. Heater 22 may be turned ON in response to the mode signal being in a second state.

Differentiator circuit 42, operating temperature circuit 38, and high temperature limit circuit 40 are each coupled to receive the temperature signal from sensor 26 over sensor communication link 30. Differentiator circuit 42 is coupled to empty tank circuit 36 by a differentiator link 41 which carries a differentiated temperature signal. The operation of fluid heating system 10 is described with reference to FIG. 1 as follows.

Heater 22 provides heat to the water in tank 24. Sensor 26 senses the temperature of the water in tank 24 and provides the temperature signal to differentiator circuit 42, operating temperature circuit 38, and high temperature limit circuit 40 via sensor communication link 30.

Operating temperature circuit 38 receives the temperature signal and determines if the temperature signal is above an operating temperature threshold. The operating temperature threshold represents the approximate temperature to which the water in tank 24 should be heated. If the temperature signal is above the operating temperature threshold, operating temperature circuit 38 sets the mode signal on the control link 34 to the first state and turns OFF heater 22. When heater 22 is turned OFF, the temperature of water in tank 24 decreases. When the temperature of the water in tank 24 decreases, sensor 26 provides a temperature signal representing a lower temperature on sensor communication link 30. If the temperature signal falls below the operating temperature threshold, operating temperature circuit 38 provides the mode signal in the second state so that heater 22 is turned ON and the water in tank 24 is again heated. Therefore, operating temperature circuit 38 cycles heater 22 so that the temperature of the water in tank 24 remains close to the operating temperature threshold. Preferably, operating temperature circuit 38 includes a hysteresis feature which reduces ON/OFF exercising of heater 22.

The temperature signal on sensor communication link 30 is also provided to high temperature limit circuit 40. High temperature limit circuit 40 has a high temperature limit threshold which represents an exceedingly high temperature (a high limit condition). The high temperature limit threshold is greater than the operating temperature threshold. High temperature limit circuit 40 provides protection in the event of a malfunction of fluid heating system 10 by providing the mode signal in the first state to turn OFF heater 22 when an exceedingly high temperature is sensed by sensor 26 (high limit condition). The high limit threshold is generally set to protect components in sensor 26, tank 24, heater 22 and control circuit 20.

Preferably, high temperature limit circuit 40 includes a latch or other automatic trip mechanism (not shown) which prevents the mode signal from returning to the second state once the high limit condition has occurred. Therefore, after turning OFF heater 22 in response to a high temperature limit, heater 22 cannot be turned ON. High temperature limit circuit 40 preferably includes a reset mechanism (not shown) for manually resetting high temperature limit circuit 40 so that heater 22 may eventually be turned ON.

The temperature signal on sensor communication link 30 is also received by differentiator circuit 42. Differentiator circuit 42 differentiates the temperature signal. The differentiated signal is provided across differentiator link 41 to empty tank circuit 36. Empty tank circuit 36 compares the differentiated temperature signal to a threshold. If the differentiated temperature signal is above a predetermined threshold, empty tank circuit 36 places the mode signal in the first state and turns OFF heater 22.

The differentiated temperature signal is preferably representative of the change in the temperature signal over time. Thus, the differentiated temperature signal is representative of the change of temperature of the water in tank 24 over time. When tank 24 is filled, the water in tank 24 changes temperature relatively slowly with respect to time and the differentiated temperature signal is small. However, as the level of water in tank 24 decreases, heater 22 is able to heat up the water more quickly. When tank 24 is substantially empty, the temperature sensed by sensor 26 changes rapidly with respect to time and the differentiated temperature signal is large.

Empty tank circuit 36 advantageously determines when tank 24 is empty by comparing the differentiated temperature signal to a predetermined threshold or value. Empty tank circuit 36 prevents overheating of tank 24 and components associated with heater 22, sensor 26, and control circuit 20 by providing the mode signal in the first state when tank 24 is empty (a dry bowl condition). Empty tank circuit 36 and differentiator circuit 42 cooperate to sense the level of water in tank 24 without the need of expensive water level sensors by utilizing sensor 26 which is necessary for operating temperature circuit 38 and high temperature limit circuit 40. Thus, empty tank circuit 36 and differentiator circuit 42 provide a low cost circuit for determining when tank 24 is empty.

Figure 2:
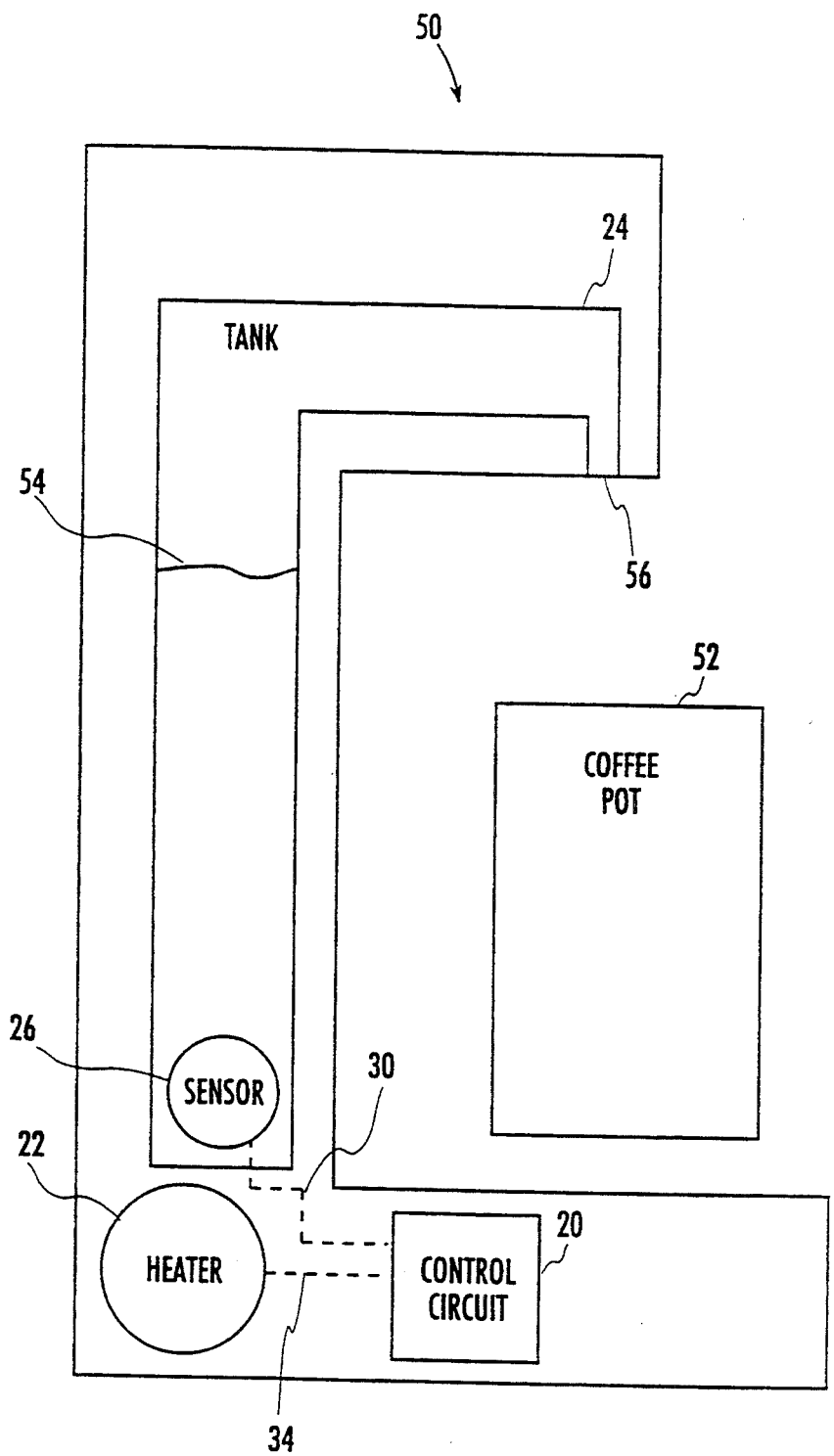
FIG. 2 is a more detailed schematic drawing of the present invention utilized in a commercial coffee brewer.

FIG. 2 is a more detailed schematic drawing of the present invention utilized in a coffee brewer system. In FIG. 2, coffee brewer 50 includes heater 22, control circuit 20, sensor 26 and tank 24. Tank 24 contains water 54 and includes an orifice 56. Heater 22 is preferably in thermal communication with the bottom of tank 24. Sensor 26 is preferably in thermal communication with water 54 in tank 24 and provides the temperature signal across sensor communication link 30. Control circuit 20 provides the mode signal across control link 34.

As water 54 is heated in tank 24, water 54 escapes through orifice 56 into coffee pot 52. The water level decreases as water 54 escapes orifice 56. As the level of water 24 is decreased to the bottom of tank 24 (dry bowl condition), control circuit 20 turns OFF heater 22 by placing the mode signal on control link 34 in the first state.

Control circuit 20 advantageously determines a dry bowl condition by differentiating the temperature signal on sensor communication link 30. Preferably, differentiating comprises determining the rate of change of temperature with respect to time to yield a differentiated signal. Control circuit 20 generates the mode signal in the first state when the differentiated signal is above a predetermined threshold or value. The predetermined threshold or value represents the speed at which the temperature of the water in tank 24 changes in response to heater 22 when tank 24 is nearly empty.

Figure 3:
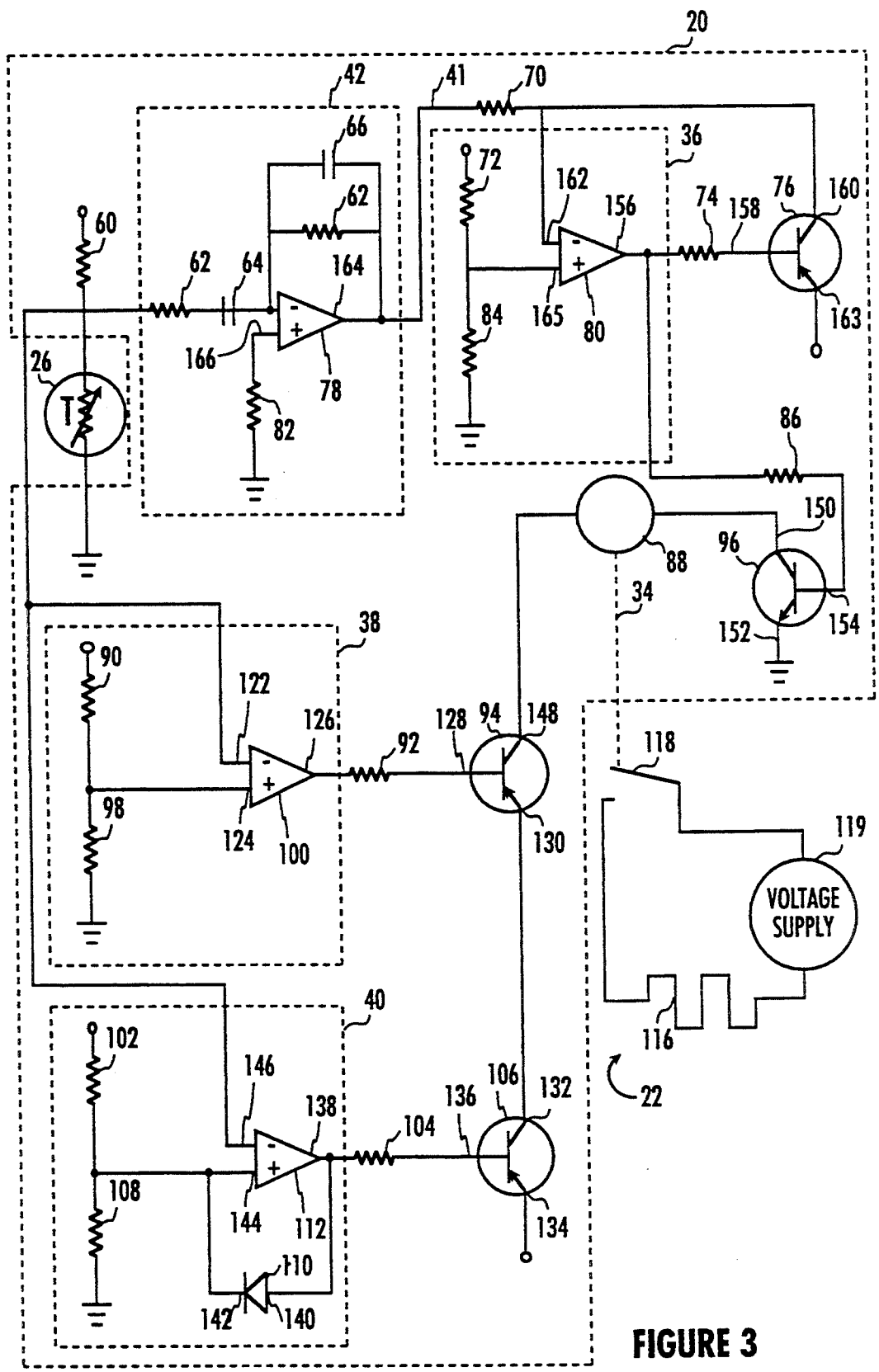
FIG. 3 is a detailed schematic drawing of a control circuit coupled to a heater in accordance with the preferred exemplary embodiment of the present invention.

FIG. 3 is a detailed schematic drawing of a control circuit coupled to a heater in accordance with the preferred exemplary embodiment of the present invention. In FIG. 3, heater 22 is comprised of a switch 118, a voltage source input 119, and a heating coil 116. Voltage source input 119 is preferably a plug or other means for receiving power from an outlet. Switch 118 is preferably a contactor or relay switch.

Switch 118 is controlled by the mode signal on control link 34. When the mode signal is in a first state, switch 118 is open. When the mode signal is in a second state, switch 118 is closed. Switch 118 may be replaced by a semiconductor switch (not shown) with control link 34 providing the mode signal to the gate (not shown) or other control electrode. Preferably, switch 118 is a set of relay contacts, and control link 34 is a magnetic circuit which controls the set of contacts. When switch 118 is closed, current is provided from voltage source input 119 through heating coil 116 which produces heat in response to the current.

Control circuit 20 includes empty tank circuit 36, operating temperature circuit 38, high temperature limit circuit 40, and differentiator circuit 42. Control circuit 20 also includes a resistor 60, a resistor 70, a resistor 74, a resistor 86, a resistor 92, a resistor 104, a transistor 76, a transistor 94, a transistor 106, and a relay coil 88. Transistors 94, 96, and 106 provide an output circuit for controlling current through coil 88 which turns heater 22 ON and OFF. Sensor 26 receives current from a voltage source VCC through resistor 60 which is coupled to sensor communication link 30.

Empty tank circuit 36 includes a resistor 72, a resistor 84, and an amplifier 80. Operating temperature circuit 38 includes a resistor 90, a resistor 98, and an amplifier 100. High temperature limit circuit 40 includes an amplifier 112, a diode 110, a resistor 102, and a resistor 108. Differentiator circuit 42 includes a capacitor 66, a capacitor 64, a resistor 62, a resistor 68, a resistor 82, and an amplifier 78.

Communication link 30 is coupled to an inverting input 122 of amplifier 100. Non-inverting input 124 of amplifier 100 is coupled to VCC through resistor 60 and to ground through resistor 98. An output 126 of amplifier 100 is coupled to base 128 of transistor 94 through resistor 92. Emitter 130 of transistor 94 is coupled to collector 132 of transistor 106. Emitter 134 of transistor 106 is coupled to VCC.

Base 136 of transistor 106 is coupled through resistor 104 to output 138 of amplifier 112 and to anode 140 of diode 110. Cathode 142 of diode 110 is coupled to non-inverting input 144 of amplifier 112. Non-inverting input 144 of amplifier 112 is coupled to VCC through resistor 102 and to ground through resistor 108. Inverting input 146 of amplifier 112 is coupled to sensor communication link 30.

Collector 148 of transistor 94 is coupled through coil 88 to collector 150 of transistor 96. Emitter 152 of transistor 96 is coupled to ground. Base 154 of transistor 96 is coupled to output 156 of amplifier 80 through resistor 86. Base 158 of transistor 76 is coupled to output 156 of amplifier 80 through resistor 74. Collector 160 of transistor 76 is coupled to inverting input 162 of amplifier 80. Emitter 163 of transistor 76 is coupled to VCC. Non-inverting input 165 of amplifier 80 is coupled to VCC through resistor 72 and to ground through resistor 84.

Inverting input 162 of amplifier 80 is coupled through resistor 70 to output 164 of amplifier 78. Non-inverting input 166 of amplifier 178 is coupled to ground through resistor 82. Inverting input 168 of amplifier 78 is coupled to output 164 through capacitor 66 and resistor 68. Capacitor 66 and resistor 68 are coupled in parallel. Inverting input 168 of amplifier 78 is coupled to sensor communication link 30 through resistor 62 and capacitor 64. Resistor 62 and capacitor 64 are coupled in series. Output 164 is coupled to differentiator link 41.

Transistors 76, 94 and 106 are preferably PNP transistors. Transistor 96 is preferably an NPN transistor. Preferably, coil 88 is electromagnetically coupled with switch 118 to control heater 22, and coil 88 and switch 118 are embodied in a single pole, double throw, 20 amp, 120 VAC sealed relay. Alternatively, empty tank circuit 36, operating temperature circuit 38, and high temperature limit circuit 40 may control heater 22 through other types of output circuits such as an OR logic device providing a control signal on a single conductor.

Sensor 26 is preferably a thermistor having a resistance of 10,000 ohms at 25° C. Operating temperature circuit 38 is designed to have an operating temperature threshold preferably between 175° F. to 210° F. Preferably, the high temperature limit threshold is set at approximately 245° F.

Amplifier 100 preferably provides 4° F. of hysteresis to operating temperature circuit 38. Thus, when the temperature falls 4° F. below the operating temperature threshold, operating temperature circuit 38 turns heater 22 ON. When the temperature exceeds the operating temperature threshold by 4° F., the operating temperature circuit 38 turns heater 22 OFF. Thus, the 4° F. of hysteresis reduces ON/OFF exercising of heater 22.

The operation of control circuit 20 is discussed with reference to FIG. 3 as follows. The resistance of temperature sensor 26 decreases as the temperature of water in tank 24 (not shown) increases. As the resistance of sensor 26 decreases in response to higher temperatures, the temperature signal (the voltage on sensor communication link 30) decreases. Therefore, sensor 26 provides a temperature signal having a voltage inversely related to the temperature.

When heating system 10 begins operation, the water is relatively cool and sensor 26 provides a temperature signal which has relatively high voltage indicating a relatively low temperature. Operating temperature circuit 38 receives the temperature signal representing the low temperature at non-inverting input 122. Resistors 90 and 98 form a voltage divider circuit which establishes the operating threshold at non-inverting input 124 of amplifier 100. Therefore, amplifier 100 provides a logic LOW at output 126 because the temperature signal is lower than the operating temperature threshold provided at non-inverting input 124. Transistor 94 is turned ON in response to the logic LOW at output 126. If transistors 96 and 106 are also turned ON, current through coil 88 (mode signal in the second state) closes switch 118 and turns heater 22 ON.

Resistors 102 and 108 form a voltage divider circuit which establishes the high limit threshold at non-inverting input 144 of amplifier 112. Amplifier 112 provides a logic LOW at output 138 in response to the temperature signal at inverting input 146 because the temperature signal is greater than the high limit threshold provided at non-inverting input 144. Transistor 106 is turned ON in response to the logic LOW at output 138. If transistors 94 and 96 are also turned ON, current through coil 88 (mode signal in the second state) closes switch 118 and turns heater 22 ON.

If tank 24 (FIG. 2) is filled with water 54 (FIG. 2), the temperature sensed by sensor 26 does not change drastically with respect to time as the water 54 is heated. In such a case, the temperature signal on communication link 30 remains relatively constant. When inverting input 168 receives a relatively constant signal across resistor 62 and capacitor 64, amplifier 78 provides a relatively low signal to inverting input 162 of amplifier 80 through resistor 70 because capacitor 66 and resistor 68 coupled between inverting input 168 and output 164 configure amplifier 78 as a differentiator. Resistors 72 and 84 form a voltage divider circuit which establishes a threshold at non-inverting input 165 of amplifier 80. Therefore, amplifier 80 provides a logic HIGH at output 156 because the threshold at non-inverting input 165 is higher than the relatively low signal at inverting input 162.

The logic HIGH at output 156 is provided to base 158 of transistor 76 and base 154 of transistor 96. Transistor 76 is turned OFF and transistor 96 is turned ON in response to the logic HIGH at output 156. Therefore, when the tank is filled with water and the water is relatively cool, transistor 96 is turned ON. If transistors 94 and 100 are also turned ON, current can travel through coil 88 (mode signal in the second state) closes switch 118 and turns heater 22 ON.

As current travels through transistors 94, 96 and 106, current travels through coil 88. When current travels through coil 88, coil 88 provides the mode signal in the second state across control link 34 which closes switch 118. When switch 118 is closed, heater 22 is turned ON as current travels through heating coil 116. When coil 88 is de-energized by turning OFF any of transistors 94, 96, or 106, control link 34 provides the mode signal in the first state which opens switch 118 and turns heater 22 OFF.

As the water is heated, the resistance across sensor 26 decreases and the voltage on sensor communication link 30 (the temperature signal) decreases, indicating a higher temperature. When the temperature signal at inverting input 122 falls below the operating temperature threshold at non-inverting input 124, amplifier 100 provides a logic HIGH at output 126 and turns OFF transistor 94. When transistor 94 is turned OFF, current cannot travel from emitter 130 to collector 148 and through coil 88. When current cannot travel through coil 88 (mode signal in first state), switch 118 is opened and heater 22 is turned OFF.

When the temperature of the water falls over 4° F. below the operating temperature threshold, amplifier 100 provides a logic high at output 126 and turns ON transistor 94. Operating temperature circuit 38 cycles heater 22 ON and OFF according to 4° F. hysteresis provided internally by amplifier 100 as described above.

If the water is heated to a temperature exceeding the high temperature limit, the temperature signal at inverting input 146 of amplifier 112 falls below the high limit threshold at non-inverting input 144, and amplifier 112 provides a logic HIGH at output 138. The logic HIGH at output 138 turns OFF transistor 106 so that current does not travel from emitter 134 to collector 132. Therefore, current does not travel through coil 88 (mode signal in first state) and switch 118 is opened.

The logic HIGH at output 138 also provides a logic HIGH at non-inverting input 144 through diode 110. When non-inverting input 144 is brought to a logic HIGH, the temperature signal at inverting input 146 is not able to overcome the logic HIGH at non-inverting input 144. Therefore, when output 138 provides a logic HIGH, amplifier 112 is latched by diode 110 to provide a logic HIGH and turn OFF transistor 106. High temperature limit circuit 40 and amplifier 112 may be reset by turning the power to control circuit 20 OFF (bringing the signal VCC to ground). Alternatively, a reset switch may be provided to reset output 138 to a logic LOW.

Also, high temperature limit circuit 40 provides a logic HIGH when sensor 26 is short circuited. When sensor 26 is short circuited, the temperature signal is lower than the high limit threshold at non-inverting input 144 and amplifier 112 provides a logic HIGH. Again, when amplifier 112 provides a logic HIGH at output 138, amplifier 112 is latched to provide a logic HIGH and turns OFF transistor 106.

When tank 24 (FIGS. 1 and 2) is less full the temperature of the water rises more rapidly within a given time and the resistance across sensor 26 decreases rapidly. When the resistance across sensor 26 decreases rapidly, the temperature signal on sensor communication link 30 decreases rapidly. Amplifier 78 receives the temperature signal at inverting input 168 and provides the differentiated temperature signal at output 164 representing the slope of the decreasing temperature signal because capacitor 66 and resistor 68 coupled between inverting input 168 and output 164 configure amplifier 78 as a differentiator. The signal at output 164 of amplifier 78 becomes more positive as the temperature signal decreases more rapidly. The differentiated temperature signal is provided via resistor 70 to inverting input 162 of amplifier 80.

When the differentiated temperature signal rises above a differentiated threshold between resistors 72 and 84 at non-inverting input 165, amplifier 80 provides a logic LOW at output 156 (dry bowl condition). The logic LOW at output 156 is provided to base 154 of transistor 96 and turns OFF transistor 96. When transistor 96 is turned OFF, current does not travel from collector 150 to emitter 152. Therefore, current is not provided through coil 88 (mode signal in the first state), and switch 118 is open.

The logic LOW at output 156 is also provided via resistor 74 to base 158 of transistor 76. The logic LOW at output 156 turns transistor 76 ON so that current travels from emitter 163 to collector 160. When transistor 76 is turned ON, a logic HIGH is provided to inverting input 162 and amplifier 80 is latched to provide a logic LOW.

When a logic LOW is provided at output 156, inverting input 162 is latched logic HIGH. Output 156 is latched to provide a logic LOW because non-inverting input 165 cannot surpass the logic HIGH at inverting input 162. Alternatively, amplifier 80 may be unlatched by turning the power to control circuit 20 OFF (bringing the signal VCC to ground). Alternatively, amplifier 80 may be unlatched by pressing a reset switch (not shown) which is configured to turn transistor 76 OFF. Therefore, transistor 76 provides a latch which turns OFF heater 22 and maintains heater 22 OFF until control circuit 20 is unlatched or reset.

Differentiator circuit 42 and empty tank circuit 36 economically provide a method and apparatus for determining when tank 24 (shown in FIGS. 1 and 2) is empty (dry bowl condition). Empty tank circuit 36 is latched OFF when tank 24 is empty to prevent overheating of heater 22 and other components in fluid heating system 10. Therefore, differentiator circuit 42 and empty tank circuit 36 economically utilize temperature sensor 26 and provide a circuit for sensing the level of water in tank 24.

It is to be understood that while the detailed drawings and specific examples given describe a preferred exemplary embodiment of the present invention, they are for the purpose of illustration only. The apparatus of the invention is not limited to the precise details and conditions disclosed. For example, although the control circuit is shown as utilized in a coffee brewing system or water heating system, the apparatus may also be employed in a cooling system. Also, although the apparatus utilizes a thermistor, various other sensors may be used. Thus, various changes may be made to the details disclosed without departing from the spirit of the invention which is defined by the following claims.

What is claimed is:

1. An apparatus for use in a container system, said container system including a temperature controller and a container, said container adapted to contain contents, said temperature controller controlling temperature of said contents in response to a mode signal being in a first state, the apparatus comprising:

temperature sensing means for sensing said temperature, said temperature sensing means generating a temperature signal related to said temperature;

differentiator means for providing a differentiated signal in response to said temperature signal, said differentiator means including a differentiator input and a differentiator output, said differentiator input being coupled with said temperature sensing means and receiving said temperature signal, said differentiator means providing said differentiated signal at said differentiator output;

control means for generating an empty container signal, said control means having a control input and a control output, said control input being coupled with said differentiator output and receiving said differentiated signal, said control means generating said empty container signal at said control output when said differentiated signal is in a predetermined relationship with a predetermined threshold, said empty container signal indicative of said container being substantially empty of said contents; and output means for providing said mode signal in said first state, said output means having a mode input coupled with said control output, said output means providing said mode signal in said first state in response to said empty container signal.

2. An apparatus for use in a container system as recited in claim 1, further comprising:

high temperature means for generating a high temperature signal in response to said temperature signal, said high temperature means including a high temperature input and a high temperature output, said high temperature input being coupled with said temperature sensing means and receiving said temperature signal, said high temperature means generating said high temperature signal at said high temperature output; and wherein said mode input is coupled with said high temperature output and receives said high temperature signal, said output means generating said mode signal in said first state in response to said high temperature signal.

3. An apparatus for use in a container system as recited in claim 2, further comprising:

latch means for latching said mode signal in said first state, wherein said latch means includes a latch input, said latch input being coupled with said high temperature output and receiving said high temperature signal, said latch means latching said mode signal in said first state in response to said high temperature signal.

4. An apparatus for use in a container system as recited in claim 3, further comprising:

a reset switch, wherein said latch means is reset by effecting said reset switch.

5. An apparatus for use in a container system as recited in claim 1, wherein said container system is employed in a coffee brewer.

6. An apparatus for use in a container system as recited in claim 5, wherein said temperature sensing means is located in a probe, and said probe is located in said container so that said probe is submerged in said contents when said container is filled with said contents.

7. A water heater control circuit for use in a water heater system including a tank, said tank for holding water, said water heater system including a heater for heating said water, the water heater control circuit comprising:
- a temperature sensor in thermal communication with said water, said temperature sensor providing a temperature signal related to temperature of said water;
- a differentiator circuit having a differentiator input and a differentiator output, said differentiator input coupled with said temperature sensor, said differentiator circuit receiving said temperature signal at said differentiator input, said differentiator circuit providing a differentiated temperature signal at said differentiator output; and
- a compare circuit having a compare input and a compare output, said differentiator output coupled with said compare input, said compare input receiving said differentiated signal, said compare circuit generating a control signal at said control output when said differentiated temperature signal is in a predetermined relationship with a threshold, said predetermined relationship being indicative of said tank being substantially empty of said water wherein said heater is turned OFF by said control signal.

8. A water heater control circuit for use in a water heater system as recited in claim 7, wherein said temperature sensor is a thermistor.

9. A water heater control circuit for use in a water heater system as recited in claim 7, wherein said water heater system is a coffee brewer.

10. A water heater control circuit for use in a water heater system as recited in claim 7, further comprising a relay coil coupled to receive said control signal, wherein said relay coil opens a contact in said heater in response to said control signal.

11. A water heater control circuit for use in a water heater system as recited in claim 7, wherein said differentiator circuit is a high gain operational amplifier having an inverting input, wherein said inverting input is coupled with said differentiator input.

12. A water heater control circuit for use in a water heater system as recited in claim 10, further comprising a first transistor and a second transistor coupled in series with said relay coil.

13. A water heater control circuit for use in a water heater system as recited in claim 12, further comprising:
- a high temperature circuit including a high temperature input and a high temperature output, said high temperature input receiving said temperature signal, said high temperature circuit providing a second control signal to said second transistor when said temperature signal is in a predetermined relationship with a threshold, said second control signal effecting said second transistor so that said relay coil turns OFF said heater, and wherein said compare circuit provides said control signal to said first transistor, said second control signal effecting said first transistor so that said relay coil turns OFF said heater.

14. A water heater control circuit for use in a water heater system as recited in claim 13, wherein said high temperature circuit is arranged to latch said control signal in a first state.

15. A water heater control circuit for use in a water heater system as recited in claim 14, wherein said latch is a diode.

16. A brewing system including a bowl adapted to hold fluid, a pot, and a heater for heating said fluid in response to a first signal, the fluid traveling from the bowl to the pot in response to being heated, the system comprising:
- temperature sensor, said temperature sensor being in thermal communication with said fluid in said bowl and having a sensor output, said temperature sensor generating a temperature signal related to said temperature at said sensor output;
- a differentiator including a differentiator input and a differentiator output, said differentiator input being coupled with said sensor output and receiving said temperature signal, said differentiator providing a differentiated temperature signal at said differentiator output; and
- control means for generating said first signal, said control means having a control input and a control output, said control input being coupled with said differentiator output and receiving said differentiated temperature signal, said control means generating a second signal when said differentiated signal is in a predetermined relationship with a threshold, said second signal indicative of a dry bowl condition.

17. The brewing system as recited in claim 16, wherein said differentiator includes an operational amplifier configured as a differential amplifier.

18. The brewing system as recited in claim 17, wherein said control means further includes a transistor coupled in series with a relay coil.

19. The brewing system as recited in claim 18, wherein said relay coil controls a conductor located in said temperature controller.

20. The brewing system as recited in claim 19, further comprising:
- a high temperature means for controlling said relay coil in response to said temperature signal, said high temperature means having a high temperature input and a high temperature output, said high temperature means providing a high temperature signal at said high temperature output when said temperature signal is in a predetermined relationship with a second threshold.

* * * * *